United States Patent [19]

Toomey, Jr.

[11] Patent Number: 4,589,968

[45] Date of Patent: May 20, 1986

[54] FILTER PRESS ELECTROCHEMICAL CELL WITH IMPROVED FLUID DISTRIBUTION SYSTEM

[75] Inventor: Joseph E. Toomey, Jr., Indianapolis, Ind.

[73] Assignee: Reilly Tar & Chemical Corp., Indianapolis, Ind.

[21] Appl. No.: 670,331

[22] Filed: Nov. 9, 1984

Related U.S. Application Data

[63] Continuation of Ser. No. 477,529, Mar. 21, 1983, abandoned.

[51] Int. Cl.$^4$ .................. C25B 9/00; C25B 15/08; C25B 13/02
[52] U.S. Cl. .................. 204/257; 204/269; 204/279
[58] Field of Search .................. 204/255–258, 204/267–270, 279; 429/34, 38, 39

[56] References Cited

U.S. PATENT DOCUMENTS

| | | |
|---|---|---|
| 2,007,096 | 7/1935 | Niederreither .................. 204/258 |
| 3,119,760 | 1/1964 | Foreman et al. .................. 204/269 |
| 3,478,042 | 11/1969 | Colchester et al. .................. 260/296 |
| 3,657,015 | 4/1972 | Veatch et al. .................. 429/38 X |
| 3,717,646 | 2/1973 | Colchester et al. .......... 260/295 AM |
| 4,031,001 | 6/1977 | Bosa .................. 204/257 |
| 4,124,478 | 11/1978 | Tsien et al. .................. 204/255 |
| 4,176,020 | 11/1979 | Misumi et al. .................. 204/72 |
| 4,196,069 | 4/1980 | Mose . |
| 4,210,512 | 7/1980 | Lawrance et al. .................. 204/257 |
| 4,269,689 | 5/1981 | Agladze et al. .................. 204/268 |
| 4,274,939 | 6/1981 | Bjareklint .................. 204/257 |
| 4,425,215 | 1/1984 | Henes .................. 204/258 |
| 4,495,048 | 1/1985 | Murakami et al. .................. 204/267 |

FOREIGN PATENT DOCUMENTS

| | | |
|---|---|---|
| 699284 | 5/1967 | Belgium . |
| 2462488 | 2/1981 | France . |
| 52-2879 | 1/1977 | Japan .................. 204/263 |
| 1522440 | 8/1978 | United Kingdom . |
| 2051865 | 1/1981 | United Kingdom . |

OTHER PUBLICATIONS

F. R. Bradbury, "Process Development, with Special Reference to Paraquat", Mod. Chem. in Industry: I.U.P.A.C. 1968, J. G. Gregory, ed.; Soc. Chem. Ind., London, 1968.
Olin Membrane Cell Technology Brochure, 1982.
ICI FM21 Membrane Cell Brochure.
Roman E. Sioda, "Flowthrough Porous Electrodes, an Emerging Technology", Chem. Engineering, Feb. 21, 1983.
SU Electro Syn Cell Brochure, Swedish National Development Company.
Ojefors et al., "Electrochemical Synthesis Cells Under Development," Kemisk Tidskrift, No. 12, 52–58 (1981).

Primary Examiner—Donald R. Valentine
Attorney, Agent, or Firm—Woodard, Weikart, Emhardt & Naughton

[57] ABSTRACT

A filter press electrochemical cell with an improved fluid distribution system for even distribution of electrolyte between cell units when connected in parallel, and from side to side and across the thickness of reaction chambers in individual cells regardless of whether parallel or series flow connection is used. Each preferred cell unit comprises two electrodes and a fluid distributor plate having at least two first holes therein and channel portions including diverging walls connecting these holes with opposite sides of a central cell opening in each plate. Preferred configurations of the triangular-shaped channel opening thereby formed permit distribution of fluid without complicating barrier structures or other constrictions in the fluid path such as used in prior art cells. Preferred and alternate cell arrangements and configurations are disclosed.

66 Claims, 4 Drawing Figures

FILTER PRESS ELECTROCHEMICAL CELL WITH IMPROVED FLUID DISTRIBUTION SYSTEM

This application is a continuation of application Ser. No. 477,529, filed Mar. 21, 1983, now abandoned.

BACKGROUND OF THE INVENTION

This invention relates generally to the field of electrochemistry, and in particular to a filter press electrochemical cell design incorporating an improved fluid distribution system.

Historically, the design of electrochemical cells has been oriented toward the processes for which they were to be used. The result is that there are many cell designs of limited utility. For instance, the electrolysis of sodium chloride solutions has dominated industrial electrochemistry but the cells used for this purpose are not applicable to other processes, particularly organic electrochemistry. While a certain amount of technology crossover is possible, as a general rule, these prior art cells work only marginally well at best in processes for which the cells were not specifically designed.

The advances which have been made in the design of these process-oriented cells have evoked interest in designing cells which would be applicable to a variety of different processes, without making major concessions on process performance in any particular case. Examples of these advances which have given credibility to the idea of a truly multipurpose cell design are the development of stable ion exchange membranes, the commercial availability of improved electrode materials such as the dimensionally stable anode, the availability of improved plastics from which the electrically non-conductive parts of the cell can be made, and advances in electrochemical engineering science.

With regard to organic electrochemistry, cost and other factors of cell design development have often not justified process-oriented cells. For example, the gathering of engineering data, construction and testing of cell prototypes, and problems of achieving a successful cell whether process-oriented or multipurpose, have caused companies engaged in chemical production to be reluctant to launch major efforts in mechanical design engineering where adequate economic justification was not present. The best economic justification is, of course, with a large-volume product. Hence, there has been more reluctance and even more of a need for a multipurpose cell in the production of intermediate- and small-volume chemical products.

Most electrochemical cells regardless of design have several common components. These are a pair of electrodes corresponding to an anode and a cathode, a cell body or frame, and some type of separator if a divided cell is desired. Variations of this basic cell have included flat plate and capillary designs, packed bed and fluidized bed designs, and even pumped slurry electrode cells. Of these, the flat plate electrode cell is most common, and is typically used in a filter press arrangement composed of any number up to one hundred or more of individual cell units or compartments formed in a single unified cell bank.

Two types of fluid and current flow are possible in such a collection or bank of cells. One is series flow where the discharge of fluid from a preceding cell is routed to the inlet of the next cell, this routing being accomplished internally within the cell body or externally using pipes, conduits, tubes or manifolds. In a similar fashion, a series or bipolar flow of electrical charge (current) can be accomplished, for example, by connecting the anode of the preceding cell to the cathode of the next cell in either a galvanic or electrogenerative cell arrangement. The other type is parallel or monopolar charge flow, which routes fluid or current to the whole collection of cells at one time from a common source or supply. Again, this can be accomplished internally or externally of the cell framework.

The preferred mode of operating a cell bank with regard to this fluid and charge flow is determined to a large extent by the process involved. Parallel fluid flow is generally preferred for many electrochemical processes as is bipolar electrical connection. However, a notable disadvantage of bipolar connection is that a certain amount of current is conducted by the fluid in connecting manifolds. This so-called by-pass current reduces cell efficiency since this flow of charge does no useful chemical work. Preferred spacial orientations of a cell bank may also exist, especially where gases formed during a particular electrolysis cause losses in efficiency by increasing resistance to current flow.

Two important features of an electrochemical cell design are the electrode and the fluid distribution network. The usable surface area of the electrode determines in part the production rate of the cell, and thus a goal of cell design development is to create as much electrode surface area within as small a cell volume as possible without altering or disturbing the other parameters of cell operation in a detrimental way. Toward this end, electrodes composed of packed or fluidized particles, expanded metal mesh, and reticulated materials such as carbon "sponges" have been developed. Most of these enhanced-surface-area (ESA) electrodes are permeable to the fluid within the cell and give rise to two types of fluid flow within the cell compartment. The flow-through type routes fluid parallel to charge flow and has been accomplished in various cell designs including the filter-press type. The flow-by type routes fluid perpendicular to charge flow and has been accomplished particularly in cylindrical cell geometries, but has not been shown commercially viable in filter press cells to the applicant's knowledge.

Fewer advances have been made in the design of fluid distributors. Distributors employing both internal and external manifold systems have been used. The important consideration in such networks is to connect the manifold to the cell in such a way as to evenly distribute fluid from side to side and across the thickness of the electrode compartment in each cell. Little concern appears to be given to fluid distribution in the case of prior art series flow cell banks. In the case of parallel fluid connection between cells, there is the additional criterion of needing equal flow into each cell connected in parallel to avoid adverse effects caused by mass- and heat-transfer variations. Other advantages also exist with even inter-cell distribution and would be obvious to those skilled in the art.

The usual approach to fluid distribution has been to accomplish the task in as small a space as possible. Most fluid distributors consist of a multitude of channels or orifices which attempt, through various means, to equalize and distribute flow rates between them. A disadvantage of such designs is the tendency of these channels to become clogged with particulate matter thereby disrupting the even distrubition of fluid or, in some cases, actually stopping fluid flow altogether. Another disadvantage, especially for electrochemical cells, is the tendency of these small channels to prevent rapid release of bubbles in the fluid which can disrupt even fluid distribution as well as cause increased cell resistance to current flow. Still yet another disadvantage is that such short distribution networks tend to maximize by-pass current losses when bipolar electrical connection between cells is used. In commercial-sized cells, all of these considerations are quite important to the optimum and efficient operation of the electrolysis reaction.

These prior art distribution networks have also suffered from having restricted supply and discharge openings and other complicating barrier structures or other constrictions in the fluid path which render them more prone to clogging, gas blockage, maldistribution or channeling of fluid, and other maladies with attendant and unavoidable harmful effects. Such structures add complexity and increased design and maintenance costs to the cell, as do the lattices, grooves, or goffering often found on exposed electrode surfaces or within cell compartments to supposedly promote better fluid distribution.

SUMMARY OF THE INVENTION

What is needed is a cell design having the versatility to be used efficiently in a great many electrochemical processes without the problems and complexities attendant prior art designs. The applicant has discovered such a design in a filter press electrochemical cell arrangement incorporating an improved fluid distribution system for providing continuous, controlled and even distribution of electrolyte between cell units when connected in parallel and from side to side and across the thickness of reaction chambers in individual cells, regardless of whether parallel or series flow connection is used.

In one embodiment of the present invention, the applicant's preferred system comprises a fluid distributor plate having two first holes and channel means connecting these holes with opposite sides of a central cell opening. These holes correspond to supply and discharge openings for electrolyte to flow through the reaction chamber or compartment defined by this central opening. The channel means includes a first conditioning portion or chamber of restricted cross section which introduces a pressure drop in fluid flowing between these holes and the central opening. Also included is a second portion which has diverging walls opening from this first portion into and substantially across opposite sides of the central cell opening. By constructing this second portion such that its preferred width at the central opening is not greater than about 5 times its length nor less than about 2 times the thickness of the plate and opening at this point, the applicant is able to achieve a uniform distribution and removal of electrolyte from side to side and across the thickness of this inner chamber. Significantly, these advantageous flow characteristics are accomplished without the need for extraneous barriers, channels, projections or other means for assisting in distributing the electrolyte between or within each cell as found in prior art designs. Moreover, excellent fluid distribution occurs at low flow rates.

In other embodiments of the invention, the applicant's distributor plate is preferably positioned between juxtaposed planar electrode plates in a filter press configuration comprised of one or more individual cell units held within a frame. Adjacent electrode plates have at least one hole therein which aligns with one of the holes in the distributor plate and completes an internal manifold system for flowing electrolyte through the cell from an external source of supply. Parallel or series fluid and current flows are possible. So are differing cell geometries, although plates that are rectangular in shape and define rectangular inner chambers are preferred. Spacer plates having coextensive central openings and mating first holes are available to separate the distributor and electrode plates, as are means employing these spacer plates, for example, to fill the central cell chamber with conductive high surface-area materials such as expanded metal mesh, metal wools, rods or cylinders, spheres, beads or other particulate matter such as carbon or lead for a packed bed arrangement.

In an alternate embodiment in which one or more divided cells are desired, the preferred distributor plate is provided with two second holes with corresponding mating holes in adjacent electrode plates. Each second hole is in turn symmetric with a first hole in the plate about at least one axis of rotation through the center of the distributor plate itself. In this regard, most preferred is three degrees of rotational symmetry for the greatest interchangeability and versatility of the applicant's invention.

In operation, electrolyte enters the applicant's preferred cell from an external supply through the internal manifold system formed by the aligned first holes in the juxtaposed electrode and distributor plates. The reduced cross section in the preferred first portion of the channel means produces a pressure difference which equalizes the distribution of fluid throughout the cell bank if more than one cell is arranged in parallel. The preferred length of this first portion serves to achieve a substantially normal velocity distribution in the electrolyte as it then enters the diverging wall portion of the distribution plate. The relation between the width and length dimensions of this second portion allows the electrolyte flow to be distributed from side to side and across the cell compartment as it enters the central reaction chamber. After passing through this chamber, the electrolyte is removed through corresponding second and first portions and aligned discharge holes in opposite ends of the adjoining electrode and distributor plates.

The applicant's experience has been that many advantages are attained with his preferred distributor and cell arrangement. These include the elimination of fluid channeling and blockage by particulate matter or gas bubbles, lower flow rates to achieve adequate distribution, simplicity of design, lower construction costs, enhanced interchangeability of cell parts, and fewer cell parts which can make assembly and maintenance easier. The applicant's design has the versatility to be used efficiently in a great many electrochemical applications, and the special advantage of being able to be used with known ESA electrodes in a filter press arrangement. It can hold these porous or packed bed electrodes in place without additional devices or complex designs, and allows for great variation in the dimensions of the electrode and distributor plates in order to achieve most efficient operation in any given electrolysis reaction. Also, the design allows for the option of flow-through or flow-by fluid flow within the electrode compartment.

Other industrially important features in the applicants's preferred design are corrosion resistance, efficient sealing, avoidance of parasitic reactions or problems caused by too large a potential distribution variation in the electrode compartment, and ready manufacture of cell parts by either machining techniques or molding. Moreover, the applicant's preferred design accommodates the ability to construct cells of many types and geometries, including: undivided capillary gap, divided capillary gap; undivided normal gap with none, one or both ESA electrodes; divided normal gap with none, one or both ESA electrode; divided with slurry electrodes, and undivided or divided planar electrode cells.

Related objects and advantages of the present invention will be apparent from the following description.

DESCRIPTION OF THE PREFERRED EMBODIMENT

Figure 1:
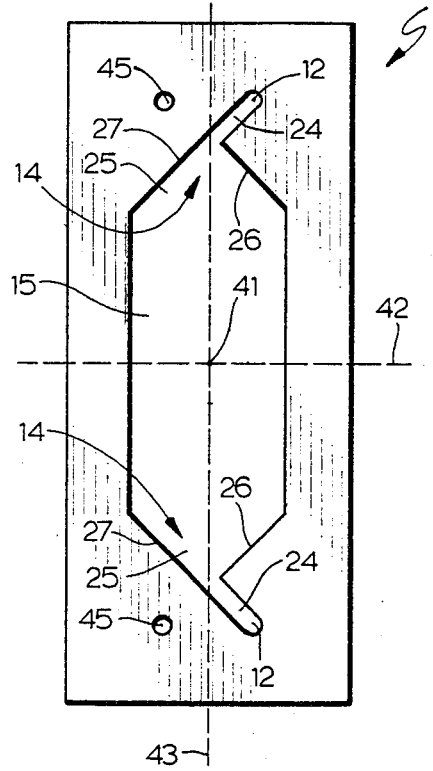
FIG. 1 is a top plan view of the preferred fluid distributor plate of the applicant's present invention.

The novel features which are believed to be characteristic of the invention are set forth with particularlity in the appended claims. For the purposes of promoting an understanding of the principles of the invention, however, both as to its organization and method of operation together with further objectives and advantages thereof, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, a thin sheet apparatus 11 is depicted which comprises the preferred fluid distributor plate of the present invention. This distributor plate 11 contains two first holes 12 and channel means 14 connecting these holes with opposite sides of a central opening 15 in the plate. These holes correspond interchangeably to a supply and a discharge opening for the flow of electrolyte through the reaction chamber or compartment 16 defined by this central opening 15 and adjacent surfaces such as 17 and 18 of electrode plates 21 and 22 in the applicant's preferred filter press cell arrangement depicted in the exploded view 23 in FIG. 3.

The channel means 14 includes a first conditioning portion or chamber 24 whose orifice opening to first holes 12 has a reduced cross-sectional area which causes the incoming and outgoing electrolyte to jet through these first portions 24 at increased velocity and with a corresponding drop in pressure. This restrictive channel portion 24 thereby serves the function of lessening the possibility of blockage or clogging at these critical points in the system while also effecting even inter-cell fluid distribution from a common external feeder and exit device (not shown) when parallel fluid manifolding is used.

Figure 3:
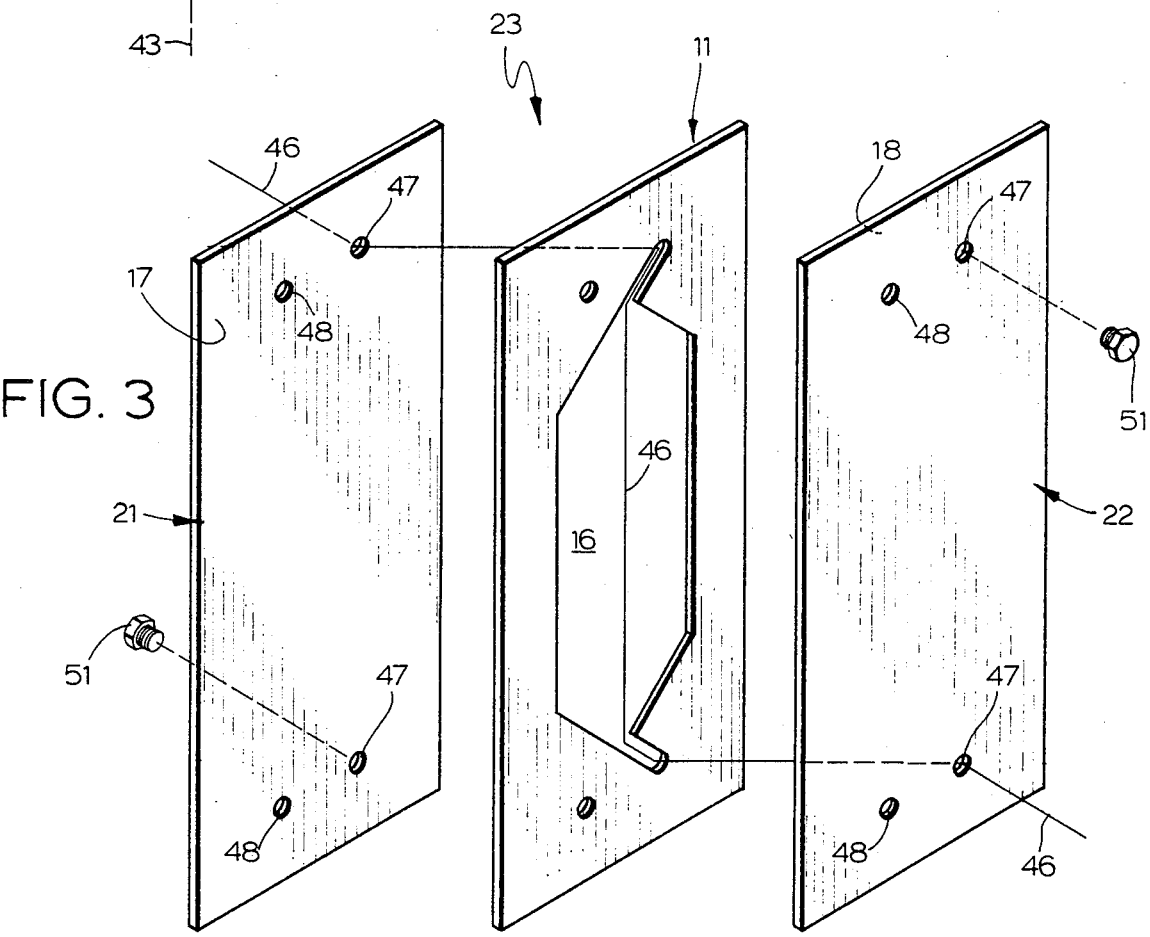
FIG. 3 is an exploded perspective view of a single undivided cell comprising the applicant's preferred fluid distributor plate positioned between two electrode plates in a filter press arrangement.

The channel means 14 also includes a second portion 25 having diverging walls 26 and 27 which form an opening or channel from first portion 24 into the central reaction chamber 16 as shown in FIGS. 1 and 3. The function of second portion 25 is to distribute incoming electrolyte as evenly and uniformly as possible from side to side and across the thickness of chamber 16, and then to effectively remove the electrolyte which exits through the corresponding channel means 14 and first hole 12 at the opposite end of the distributor plate 11. This is accomplished in the applicant's preferred embodiment by constructing channel means 14 with the preferred width 28 of opening 31 being not greater than about 5 times its length 32. By thus preventing the walls from diverging too rapidly, even distribution is achieved not so much by the pressure drop in the fluid flowing through it but rather by the shear forces normal to the axis of fluid flow (tangential shear) as the channel walls diverge. Turbulent regime fluid flow when present also aids in this distribution process.

The applicant's experience has been that his preferred distributor plate 11 has the advantage of being virtually impervious to blockage by normally encountered particulate matter or gas bubbles in part at least because of its open design, while at the same time giving extremely even fluid distribution. His work has also shown that preferred width 28 should not be less than about 2 times the corresponding thickness or depth 33 of the plate or central opening 15 to accomplish these beneficial results. This relationship is better shown in FIG. 2 for the preferred embodiment of the applicant's channel means 14. In this regard, more preferred thus far is a ratio of about 2:1 for the corresponding width and length of opening 31, and a ratio of greater than about 10:1 for its width to depth particularly in a commercial-sized cell. At this time, it is also most preferred as shown in the drawings that channel means 14 and opening 15 extend completely through plate 11 throughout their lengths. It is possible, however, to machine or mold differing depths for these areas within the scope and advantages of the applicant's invention.

The distribution of electrolyte throughout central opening 15, or chamber 16, of the applicant's preferred invention is accomplished solely by this configuration of channel means 14 without the need for additional fluid distribution or deflection means such as lattices, grooves, or goffering on the exposed electrode surfaces or other interposed surface areas. This success is also achieved without the need for barriers, projections, bosses or other members of this type which add to the complexity and cost of the design, and complicate the operation of such a cell, as found in the prior art.

Figure 2:
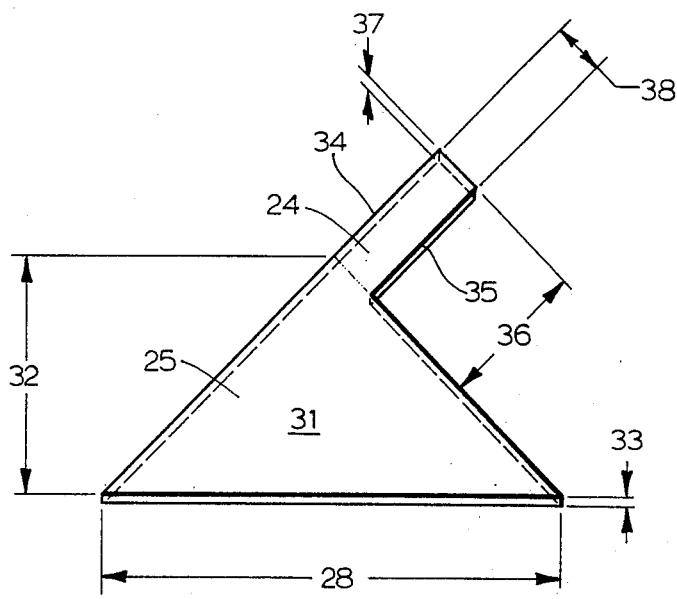
FIG. 2 is an enlarged representation of the preferred channel means and configuration 14 of the applicant's distributor plate depicted in FIG. 1.

Referring further to FIG. 2, the preferred restrictive channel 24 provides the additional advantage of substantially normalizing the velocity distribution of electrolyte as it passes between the manifold of first hole 12 and the second portion 25 of the distributor. This enhances the side-to-side distribution of electrolyte as it enters the opening 31 described above. To accomplish this result, the preferred configuration of first portion 24 has two substantially parallel walls 34 and 35 with its length 36 being greater than the value of its normalized hydraulic radius at the orifice opening to the first holes 12. In this regard, "hydraulic radius" is a term used in fluid mechanics to arrive at a value for comparison of noncircular channel constructions, and it is equal to the cross-sectional area of a channel at a given point divided by its wetted perimeter. Since actual dimensions vary greatly with the scale on which a cell is built, this hydraulic radius is normalized for purposes of comparison and description of the applicant's invention by expressing all sides of the opening as multiples of its shortest side. In the preferred case, it would equal the normalized calculation of width 38 of first portion 24 times its thickness 37 divided by the sum of two times this width 38 plus two times this thickness 37.

Also preferred from testing thus far performed is that opening 31 be generally triangular in configuration and that the first and second portions 24 and 25 have one common planar wall. In FIGS. 1 and 2, this common wall is composed of wall portions 34 and 27, while the other two wall portions 35 and 26 experience a change in slope of the tangent lines to such walls where the first and second portions of channel means 14 meet. Successful distribution of electrolyte is enhanced by this configuration, and by the preferred base 28 of triangular opening 31 being substantially equal to the width of central opening 15 in plate 11 at the point of contact between the two.

In large-scale cells, the total width of the central opening 15 may require a diverging-wall channel 25 of a length that is unwieldy and difficult to accommodate. In these cases, an alternate embodiment is to use multiple sets of first holes 12 and channel means 14 whose combined widths 28 approximately equal the width of the central opening 15. This is accomplished, for example, by simply positioning the sets of first holes 12 side by side to one another in the distributor plate on opposite sides of the central opening 15 with aligning holes in adjacent electrode plates.

As to configuration, the plate 11 can be circular, retangular, hexagonal, or whatever configuration is desired for the ultimate external shape of a heat-exchanger, battery, or other electrochemical cell pack or use to which the thin sheet device will be put. The most convenient and preferred configuration is for plate 11 to be rectangular. This is also true for its central opening 15. As to materials of construction, distributor plate 11 is preferably made of polyethylene, polypropylene, polyvinylchloride or some other inert plastic or other material that is electrically nonconductive and is resistant to attack by the chemicals employed. Other examples include nylon, polysulfones, laminated epoxy or phenolic resins, various rubbers, woods, ceramics, Teflon and related plastics, Celcon and related materials, Kel-F and related materials, Plexiglas or Lexan and other related plastics. Injection or other molding techniques as well as machining techniques can be employed to fabricate these parts, depending at least in part upon the total number of parts required. To date, standard machining techniques have been used in the applicant's work.

As to dimensions, the applicant's preferred distributor plate 11 can understandably be constructed in many shapes and sizes depending in part upon the application for which it is to be used. For example, dimensions will vary significantly if a laboratory- or industrial-sized cell is desired. By way of example only, in one preferred embodiment of the applicant's work, the preferred thickness of the distributor plate 11 was about $\frac{1}{8}$ inch. The preferred first portion 24 of channel means 14 was about 1 inch wide and about 3 inches long, and its preferred second portion 25 had a base width of about 9 inches at the central opening 15 and a preferred length of about $4\frac{1}{2}$ inches.

Referring now to FIGS. 1 and 3, one advantage of the applicant's preferred fluid distribution system is the versatility of its individual components and their adaptability for multiple uses. This has great significance when dealing with divided and packed bed cell arrangements as discussed with respect to FIG. 4 herein. However, even in a single undivided filter press cell as shown in FIG. 3, these advantages are apparent. At a minimum, the first supply and drainage holes 12 are positioned in substantially opposite locations to one another such that there is symmetry between these holes about at least one axis of rotation through the center 41 of distributor plate 11. In FIG. 1, these axes are identified as latitudinal line or axis 42, longitudinal line or axis 43, and vertical line or axis 41 coming out of the drawing sheet.

This versatility is enhanced in the applicant's preferred plate 11 by the presence of two second holes 45 which are spaced apart and which are each symmetrical with a different one of the first holes 12 about at least one axis of rotation of the plate. In fact, most preferred as shown in the applicant's plate 11 is to provide three degrees of rotational symmetry for these first and second holes about the axes through the center 41 of the plate. This allows the plate to be rotated, or flipped over, in any direction while maintaining the alignment and mating of the positions of first holes 12 and second holes 45 to permit the user great interchangeability in setting up his internal manifold system for a given operation. It is understood that the applicant's invention is not limited by the precise position or alignment of his preferred holes and channels as depicted in the drawings herein. The connecting channel means 24 and two first holes 12 in FIG. 1, for example, could just as easily be located diagonally on opposite longitudinal sides of the plate 11 with or without symmetry being present while still coming within the scope and coverage of the applicant's invention. The same is true of second holes 45.

In operation, one or more preferred cell units 23 are employed having two electrodes and at least one of the applicant's distributor plates held in a filter press arrangement. The simplest of these is the single undivided cell configuration 23 as depicted in FIG. 3. Preferred plate 11 is positioned between two planar electrode plates 21 and 22. Separate means (not shown) are provided to press these plates tightly together and to seal their respective fluid paths from leakage. Means (not shown) are also provided for establishing an electrical potential between the corresponding anode and cathode as, for example, by connecting alternate electrode plates to opposing poles of a source of direct current. Since such general operational and constructional features of the foregoing type of electrolytic cell are well known to those skilled in the art, specific means for such activation and operation will not be discussed in detail in this application. By way of example only, it is noted that at least two devices have been commonly used in the past to compress cell components. The first positions two solid or partial plates at opposite ends of the cell with holes or other means for bolting these plates tightly together. The second is an apparatus having one fixed and one movable plate with mechanical or hydraulic rams to compress the cell components which are positioned therebetween. Both devices have been used successfully in the applicant's work thus far. Proper alignment and sealing of the electrode and distributor plates are also important, with flat gaskets or sheets having been used successfully as have O-ring seals.

A great variety exists as to possible configurations and materials suitable for use as the electrodes in the applicant's filter press cell arrangements. As mentioned previously, such electrodes include generally planar or plate forms as well as various enhanced-surface-area (ESA) electrodes such as packed or fluidized particles, expanded metal mesh, and reticulated materials such as carbon "sponges" and the like. The electrode configurations used in the applicant's preferred cell unit 23 are as conductive plates 21 and 22. Suitable electrode materials also vary greatly, including such materials as mercury, mercury amalgams, lead, lead alloys with antimony and/or silver, cadmium, titanium, silver or carbon, and others which are commonly used and available in the industry. The choice of electrode material is tied to the chemistry involved. As to suitable electrolyte solutions, it is also understood that these depend upon the electrochemistry of the reaction to be conducted and bear no relation or limitation on the scope of the applicant's present invention.

A possible flow pattern for electrolyte through the single cell 23 in FIG. 3 is indicated by line 46. Flow may be in either direction, and as seen in the drawing, corresponding holes 47 and 48 in each electrode plate 21 and 22 align with the first and second holes in distributor plate 11 to provide for greater versatility and interchangeability of the individual component parts. The ends of the manifold defined by the unused holes 12 and 47 are preferably sealed by threaded or other plugs such as 51 so as to route electrolyte along line 46. Alternately, electrolyte may be fed and discharged using both sets of these holes 12 and 47 concurrently. Establishing a bank of several such individual cell units 23 as shown in FIG. 3 is accomplished, for example, simply by continuing to alternate distributor and electrode plates whereby corresponding holes establish an internal manifold system for the supply and discharge of electrolyte into and from the several cell compartments in connection with an external source of fluid supply.

Figure 4:
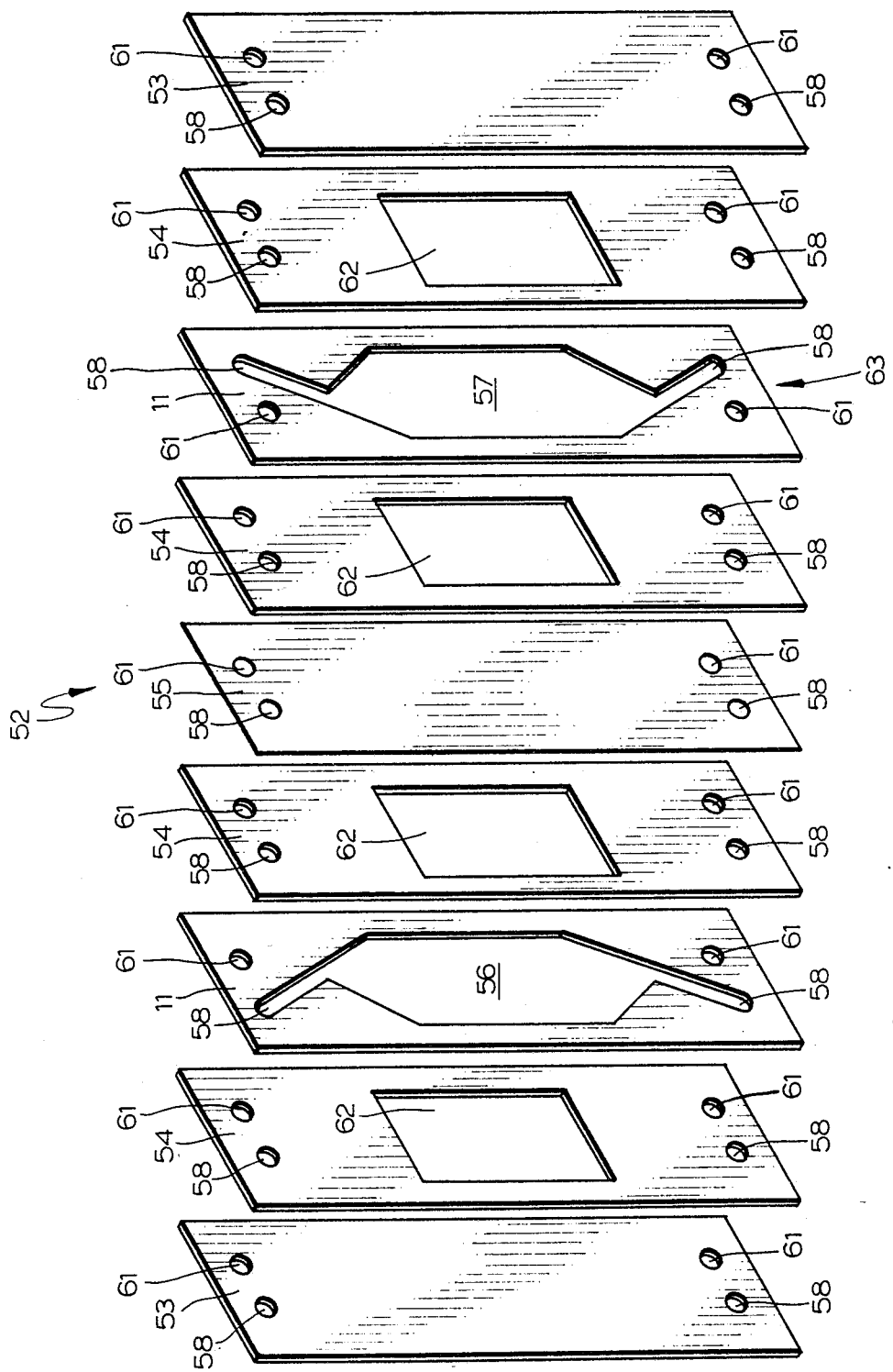
FIG. 4 is an exploded perspective view of an alternate embodiment of the applicant's invention comprising a single divided cell incorporating the applicant's preferred fluid distributor plates in a filter press arrangement.

Referring now to FIG. 4, an alternate preferred cell unit or module 52 is shown which comprises a single divided cell also employing the preferred distributor plate 11 discussed above. The additions to this cell arrangement besides distributor plates 11 and electrode plates 53 are four spacer plates 54 and a central divider or separator plate 55, such as a selectively permeable membrane, which separates the adjacent catholyte and anolyte electrolysis compartments represented by numerals 56 and 57. Spacer plates 54 and separator plate 55 all have first holes 58 and second holes 61 which align and mate with the corresponding holes in the distributor and electrode plates. Spacer plates 54 also include a central openings 62 which is approximately equal in size to adjacent openings 15 in the distributor plates thereby enlarging the depth or thickness of the individual reaction chambers.

As to dimensions, the spacer plate 54 can be any thickness, although the desired total separation of juxtaposed electrodes within each cell unit must be considered with regard to overall cell efficiency. The spacers are generally preferred to be less than about 2 inches in thickness as with the preferred distributor plates. Alternately, the spacer and distributor plates can be formed from a single thickness or sheet such that the formed distribution channel means 14 do not go completely through this combined plate throughout its length. Also alternately, one or more of the four spacer plates 54 in FIG. 4 can be removed or its dimensions varied without altering the essential function of the applicant's divided cell. The spacer plates can be of virtually any construction, with preferred plates 54 in the applicant's work being rectangular and of the same material indicated previously for preferred distributor plates 11.

In operation, the single divided cell 52 shown in FIG. 4 highlights the importance of the symmetry described above in the applicant's preferred structures. All components of cell unit 52 are interchangeable with corresponding components without any loss in function. Once again, the internal manifold system in the applicant's design functions to channel electrolyte through corresponding cathode and anode compartments by means of the aligned holes in adjacent plates. Differing solutions have been used in the respective catholyte and anolyte compartments 56 and 57 simply by rotating the second distributor plate indicated by numeral 63 in the drawing to align its first holes 58 with the series of second holes 61 in the adjoining spacer, separator, and electrode plates. As before, cell unit 52 can be repeated as many times as physically possible in arranging a multi-unit filter press cell bank. Also, the terminal electrode plates in the bank can include some capping or plugging of appropriate holes 58 and 61 to seal off the ends of the individual flow paths for the catholyte and anolyte solutions. Multiple compartment cells having more than two chambers, which are suitable for desalination and other processes, can also be formed by repeating units of the applicant's distributor plate 11 with or without spacer plates 54 and with several separator plates 55, and then by utilizing three or more separate sets of holes and fluid channel means as described above.

A further alternate embodiment which adds to the versatility of the applicant's invention is that his cell units are readily adapted to a packed bed arrangement which significantly increases the effective electrode area, production rate, mass transport, heat transport, and resulting efficiency for a given electrolysis reaction. Alternately, other types of enhanced surface-area (ESA) electrodes can also be employed with the applicant's cell design to realize these benefits. Since the general operation and construction of packed-bed cells is known to those skilled in the art, specific means will not be discussed in detail. Significantly, the applicant is not aware of any prior art method or device which combines this known packed-bed technology with a thin sheet filter press cell arrangement as in his invention.

On the matter of how to employ a packed-bed in the applicant's work, this is accomplished during assembly of the individual cell components as, for example, simply by inserting the conductive packing material into each cell chamber or compartment as it is constructed. Acceptable packing material is well known in the art, and may include lattice or woven sheet-like materials, fused or sintered particulate matter, reticulated conductive carbon materials, spherules, rods, cylinders or loose particulate matter such as carbon or lead. If loose material is desired, one alternate method of introducing the packing is by means of either a specially designed spacer or interelectrode plate. A suitable spacer plate would have a channel opening extending from the plate edge to near the top of the central opening. The particulate matter is introduced from the outside via this feeder hole until the chamber is full, and the opening is then sealed by a cap or plug to prevent leakage during operation. An optional interelectrode plate would be a flat plate inserted between the electrodes of adjacent cells also having a feeder tube from the plate edge to a point near where the top of the central cavity would be located. A mating hole in the face of this plate and the adjoining electrode plate would form an L-shaped feeder tube for introducing particulate matter through the electrode plate into the central cell chamber.

In yet another alternate embodiment, if loose particulate matter is used on only one side of a divided cell, then some means of support may be used in the unpacked electrode compartment to prevent undue stresses on the separator plate. These types of support are known to those skilled in the art and will therefore not be discussed in detail here.

While various preferred and alternate embodiments of the present invention have been described in detail in the above paragraphs, these are only representative of the many possible cell constructions within the scope of the applicant's cell design invention as described and claimed herein.

I claim:

1. A filter press electrochemical cell arrangement including one or more cell units held within a frame, each unit comprising two electrodes and a fluid distributor plate, said plate having two first holes therein and channel means for connecting said holes with opposite sides of a central opening in said plate, said holes corresponding to a supply and a discharge for fluid flowing through the reaction chamber defined by said central opening, said channel means including a first portion for introducing a pressure drop in fluid flowing between said holes and said central opening and a second portion having diverging walls opening from said first portion into said central opening for delivering fluid from side to side and across the thickness of said chamber, the width of said second portion at said central opening being not greater than about 5 times its length nor less than about 2 times the thickness of said plate.

2. The cell arrangement in claim 1 in which the width of said second portion is substantially equal to the width of said central opening at the point of contact therebetween.

3. The cell arrangement in claim 2 in which said second portion delivers fluid from side to side and across the thickness of said central opening without additional fluid distribution means.

4. The cell arrangement in claim 3 in which said plate includes more than one set of said first holes with said channel means connecting said sets to opposite sides of said central opening in said plate, the combined widths of said second portions on one side of said central opening being substantially equal to the width of said central opening at the point of contact therebetween.

5. The cell arrangement in claim 3 in which said holes are symmetrical about an axis of rotation through the center of said plate.

6. The cell arrangement in claim 3 in which said first portion has a substantially constant normalized hydraulic radius throughout its length.

7. The cell arrangement in claim 3 in which said first portion has two substantially parallel walls and a length sufficient to achieve a substantially normal velocity distribution in fluid passing therethrough.

8. The cell arrangement in claim 7 in which the length of said first portion is equal to or greater than its normalized hydraulic radius at the orifice opening between said first portion and said first holes in said plate.

9. The cell arrangement in claim 7 in which the diverging walls of said second portion form a generally triangular-shaped opening from said first portion into said central opening in said plate.

10. The cell arrangement in claim 9 in which said electrodes include planar plates with said distributor plate positioned therebetween, each of said electrode plates having a first hole therein aligning with one of said first holes in said distributor plate to complete an internal manifold system for flowing fluid through said cell unit from an external source of supply.

11. The cell arrangement in claim 10 in which said distributor plate has two second holes therein, each of said second holes being symmetrical with a different one of said first holes about an axis of rotation through the center of said distributor plate.

12. The cell arrangement in claim 11 in which one or more of said cell units additionally comprises a second fluid distributor plate rotated 180° about its symmetrical axis of rotation and with each said electrode plate having a second hole therein with said distributor plates and said electrode plates being positioned such that a first hole of said rotated distributor plate will be aligned with one of said second holes in each said electrode plate and in the nonrotated said distributor plate to complete a second internal manifold system for flowing a second fluid through said cell unit from a second external source of supply.

13. The cell arrangement in claim 12 in which each of said cell units having said second distributor plate additionally comprises a separator plate positioned between said juxtaposed distributor plates for separating the two electrode compartments formed thereby, said separator plate having holes therein aligning with said first and said second holes in said electrode and said distributor plates for completing the internal manifold system for each cell unit.

14. The cell arrangement in claim 13 additionally comprising spacer plates for positioning between said distributor plates and said electrode plates, said spacer plates including a central opening and first and second holes therein aligning with said corresponding opening and holes in said adjacent distributor plate.

15. The cell arrangement in claim 14 comprising additional said spacer plates for positioning between said distributor plates and said separator plate.

16. The cell arrangement in claim 14 additionally comprising an amount of conductive high surface-area material filling said central cell chamber defined by said distributor plates in at least one of said cell units thereby establishing a packed bed filter press cell arrangement.

17. The cell arrangement in claim 16 additionally comprising means including a sealable channel opening in at least one of said spacer, electrode or distributor plates in a cell unit for introducing said packing material into said central cell chamber defined thereby.

18. The cell arrangement in claim 16 in which said first portion has a substantially constant normalized hydraulic radius throughout its length.

19. The cell arrangement in claim 18 in which said distributor plate includes more than one set of said first holes with said channel means connecting said sets to opposite sides of said central opening therein, the combined widths of the triangular openings of said second portions on one side of said central opening being substantially equal to the width of said central opening at the point of contact therebetween.

20. The cell arrangement in claim 18 in which said electrode plates and said distributor plate are generally rectangular in configuration as is said central cell chamber defined thereby.

21. The cell arrangement in claim 20 in which said distributor plate is an electrically nonconductive material resistant to chemical attack.

22. The cell arrangement in claim 21 in which said distributor plate is of a material selected from the group consisting of polyethylene, polypropylene and polyvinylchloride.

23. The cell arrangement in claim 21 in which the thickness of said distributor plate is about 2 inches or less, and the width of the triangular opening of said second portion of said channel means is about 2 times its length or less.

24. The cell arrangement in claim 23 in which said one wall of said first portion of said channel means is coplanar with a wall of the second portion thereof.

25. The cell arrangement in claim 24 in which the length of said first portion of said channel means is at least as great as its width.

26. The cell arrangement in claim 25 in which said first portion of said channel means is about 1 inch wide and about 3 inches long and said second portion thereof has a width of about 9 inches at said central opening and a length of about 4½ inches.

27. The cell arrangement in claim 11 in which said first and said second holes in said distributor plate are symmetrical about all three axes of rotation through the center of said distributor plate, said electrode plates each having two first holes and two second holes therein aligning with said corresponding holes in said distributor plate.

28. The cell arrangement in claim 11 additionally comprising more than one of said cell units in juxtaposed position with adjacent ones of said distributor plates sharing a common one of said electrode plates positioned therebetween.

29. The cell arrangement in claim 10 additionally comprising means including an amount of conductive high surface-area material in said central opening and a separator plate between said distributor plate and one of said electrode plates in a cell unit for establishing a packed bed filter press cell arrangement therein.

30. The cell arrangement in claim 1 in which the width of said second portion at said central opening is about 2 times its length and about 10 times the thickness of said plate.

31. A fluid distributor plate for use in an electrochemical cell of the filter press type,
said plate having two first holes therein and channel means for connecting said holes with opposite sides of a central opening in said plate, said holes corresponding to a supply and a discharge for fluid flowing through the reaction chamber defined by said central opening,
said channel means including a first portion for introducing a pressure drop in fluid flowing between said holes and said central opening and a second portion having diverging walls opening from said first portion into said central opening for delivering fluid from side to side and across the thickness of said chamber, the width of said second portion at said central opening being not greater than about 5 times its length nor less than about 2 times the thickness of said plate.

32. The distributor plate in claim 31 in which the width of said second portion is substantially equal to the width of said central opening at the point of contact therebetween.

33. The distributor plate in claim 32 in which said second portion delivers fluid from side to side and across the thickness of said central opening without additional fluid distribution means.

34. The distributor plate in claim 33 in which said plate includes more than one set of said first holes with said channel means connecting said sets to opposite sides of said central opening in said plate, the combined widths of said second portions on one side of said central opening being substantially equal to the width of said central opening at the point of contact therebetween.

35. The distributor plate in claim 33 in which said holes are symmetrical about an axis of rotation through the center of said plate.

36. The distributor plate in claim 33 in which said first portion has a substantially constant normalized hydraulic radius throughout its length.

37. The distributor plate in claim 33 in which said first portion has two substantially parallel walls and a length sufficient to achieve a substantially normal velocity distribution in fluid passing therethrough.

38. The distributor plate in claim 37 in which the length of said first portion is equal to or greater than its normalized hydraulic radius at the orifice opening between said first portion and said first holes in said plate.

39. The distributor plate in claim 37 in which the diverging walls of said second portion form a generally triangular-shaped opening from said first portion into said central opening in said plate.

40. The distributor plate in claim 39 in which said distributor plate has two second holes therein, each of said second holes being symmetrical with a different one of said first holes about an axis of rotation through the center of said distributor plate.

41. The distributor plate in claim 40 in which said first and said second holes in said distributor plate are symmetrical about all three axes of rotation through the center of said distributor plate.

42. The distributor plate in claim 41 in which said first portion has a substantially constant normalized hydraulic radius throughout its length.

43. The distributor plate in claim 42 in which said distributor plate includes more than one set of said first holes with said channel means connecting said sets to opposite sides of said central opening therein, the combined widths of the triangular openings of said second portions on one side of said central opening being substantially equal to the width of said central opening at the point of contact therebetween.

44. The distributor plate in claim 43 in which said distributor plate is generally rectangular in configuration as is said central cell chamber therein.

45. The distributor plate in claim 44 in which said distributor plate is an electrically nonconductive material resistant to chemical attack.

46. The distributor plate in claim 45 in which said distributor plate is of a material selected from the group consisting of polyethylene, polypropylene and polyvinylchloride.

47. The distributor plate in claim 45 in which the thickness of said distributor plate is about 2 inches or less, and the width of the triangular opening of said second portion of said channel means is about 2 times its length or less.

48. The distributor plate in claim 47 in which said one wall of said first portion of said channel means is coplanar with a wall of the second portion thereof.

49. The distributor plate in claim 48 in which the length of said first portion of said channel means is at least as great as its width.

50. The distributor plate in claim 49 in which said first portion of said channel means is about 1 inch wide and about 3 inches long and said second portion thereof has a width of about 9 inches at said central opening and a length of about 4½ inches.

51. The distributor plate in claim 50 in which said first portion of said channel means has one wall thereof not coplanar with said diverging walls of said second portion thereof.

52. The cell arrangement in claim 31 in which the width of said second portion at said central opening is about 2 times its length and about 10 times the thickness of said plate.

53. A fluid distributor plate for use in an electrochemical cell of the filter press type, said plate having two first holes therein and channel means for connecting said holes with opposite sides of a central opening in said plate, said holes corresponding to a supply and a discharge for fluid flowing through the reaction chamber defined by said central opening, said channel means including a first portion for introducing a pressure drop in fluid flowing between said holes and said central opening and a second portion having diverging walls opening from said first portion into said central opening for delivering fluid from side to side and across the thickness of said chamber without additional fluid distribution means, said first portion of said channel means having one wall that is not coplanar with said diverging walls of said second portion thereof.

54. The distributor plate in claim 53 in which the width of said second portion is substantially equal to the width of said central opening at the point of contact therebetween.

55. The distributor plate in claim 54 in which the width of said second portion at said central opening is not greater than about 5 times its length nor less than about 2 times the thickness of said plate at said opening.

56. The distributor plate in claim 55 in which said first portion has two substantially parallel walls and a length sufficient to achieve a substantially normal velocity distribution in fluid passing therethrough.

57. The cell arrangement in claim 56 in which the length of said first portion is equal to or greater than its normalized hydraulic radius at the orifice opening between said first portion and said first holes in said plate.

58. The cell arrangement in claim 57 in which the diverging walls of said second portion form a generally triangular-shaped opening from said first portion into said central opening in said plate.

59. The cell arrangement in claim 58 in which said distributor plate has two second holes therein, each of said second holes being symmetrical with a different one of said first holes about an axis of rotation through the center of said distributor plate.

60. The cell arrangement in claim 59 in which said first and said second holes in said distributor plate are symmetrical about all three axes of rotation through the center of said distributor plate.

61. The cell arrangement in claim 60 in which said distributor plate is generally rectangular in configuration as is said central cell chamber therein.

62. The cell arrangement in claim 61 in which said distributor plate is an electrically nonconductive material resistant to chemical attact such as polyethylene, polypropylene or polyvinylchloride.

63. The cell arrangement in claim 62 in which the thickness of said distributor plate is about 2 inches or less, and the width of the triangular opening of said second portion of said channel means is about 2 times its length or less.

64. The cell arrangement in claim 63 in which one wall of said first portion of said channel means is coplanar with a wall of the second portion thereof.

65. The cell arrangement in claim 64 in which said first portion of said channel means is about 1 inch wide and about 3 inches long and said second portion thereof has a width of about 9 inches at said central opening and a length of about 4½ inches.

66. The cell arrangement in claim 55 in which the width of said second portion at said central opening is about 2 times its length and about 10 times the thickness of said plate.

* * * * *